W. M. RANEY.
COMBINED HAY BALER.
APPLICATION FILED APR. 12, 1913.
1,096,948.
Patented May 19, 1914.
5 SHEETS—SHEET 5.
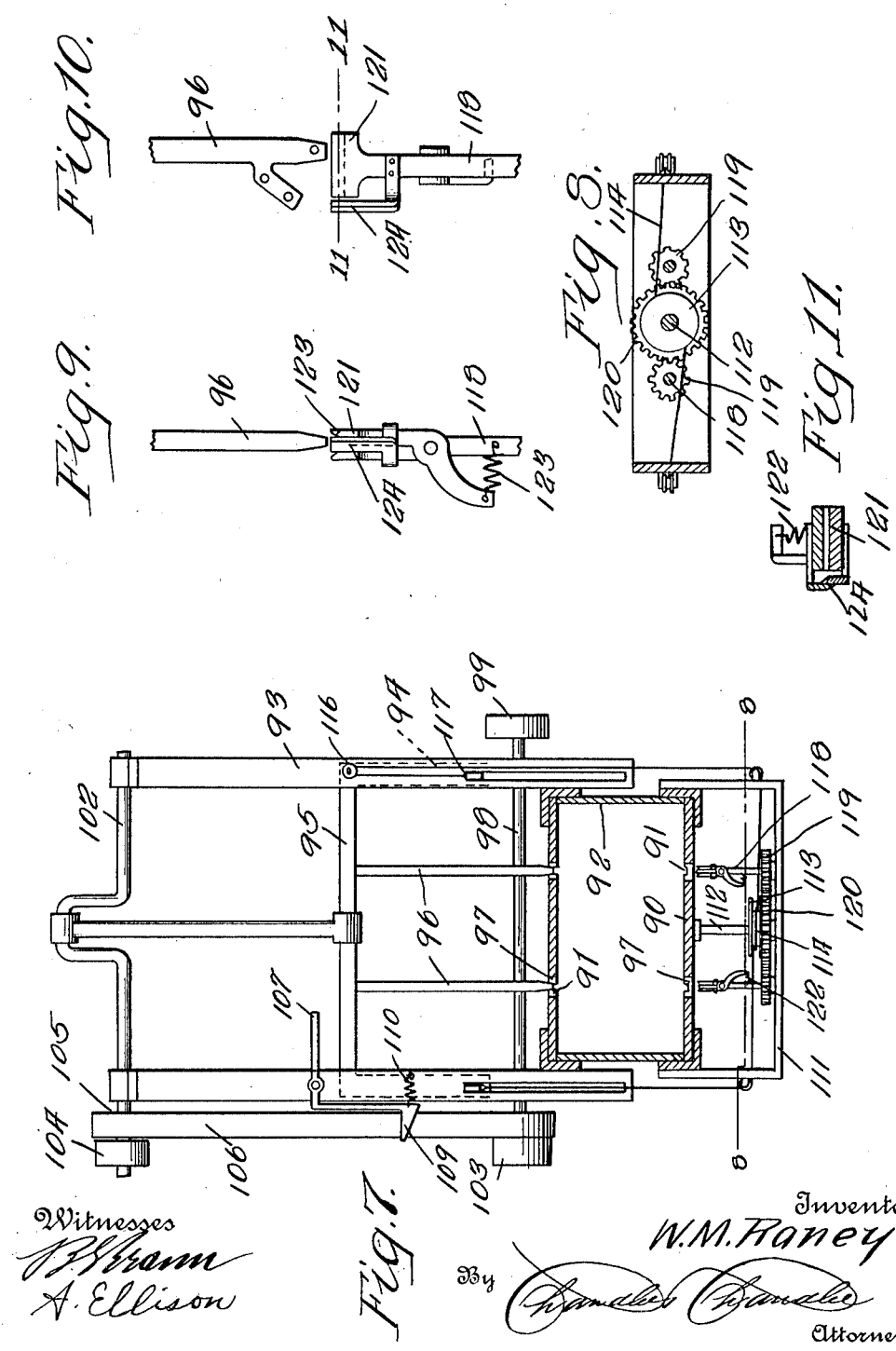

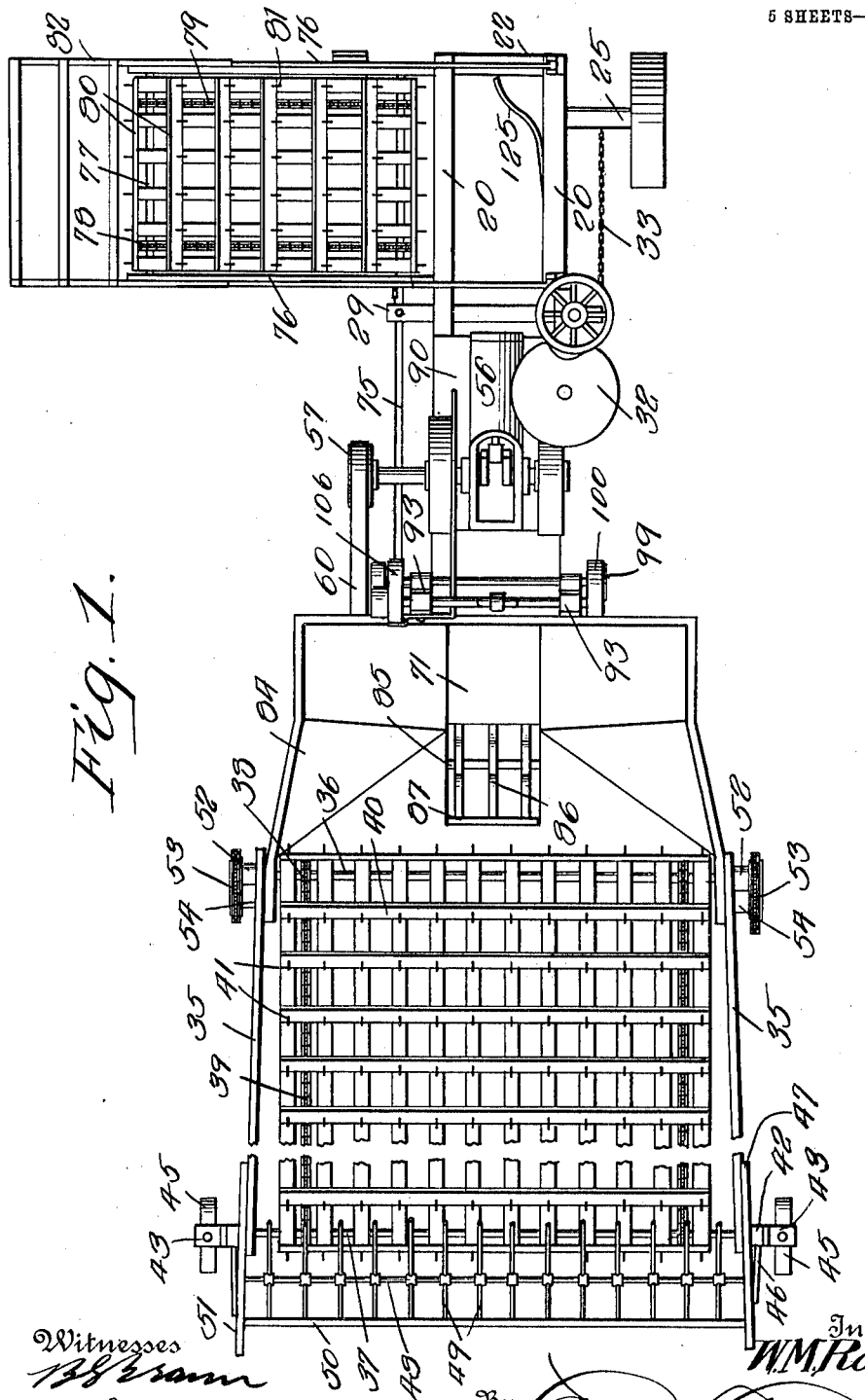

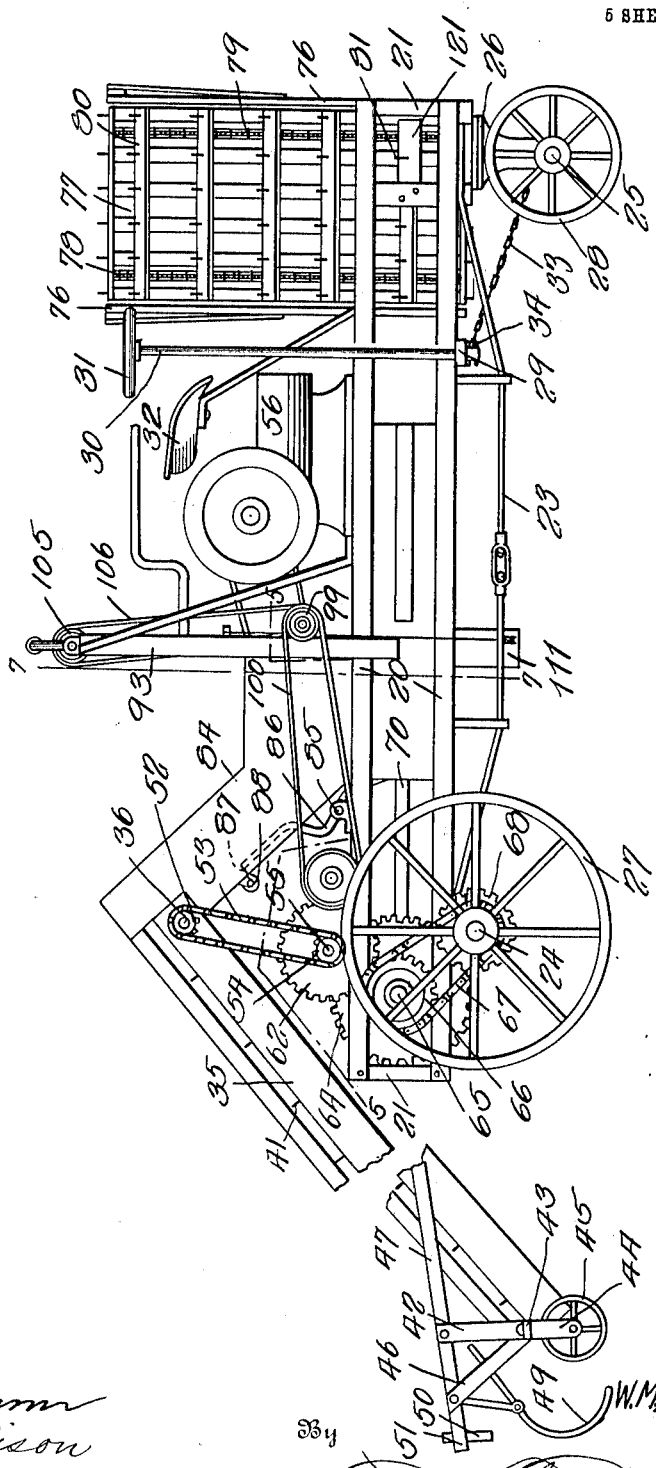

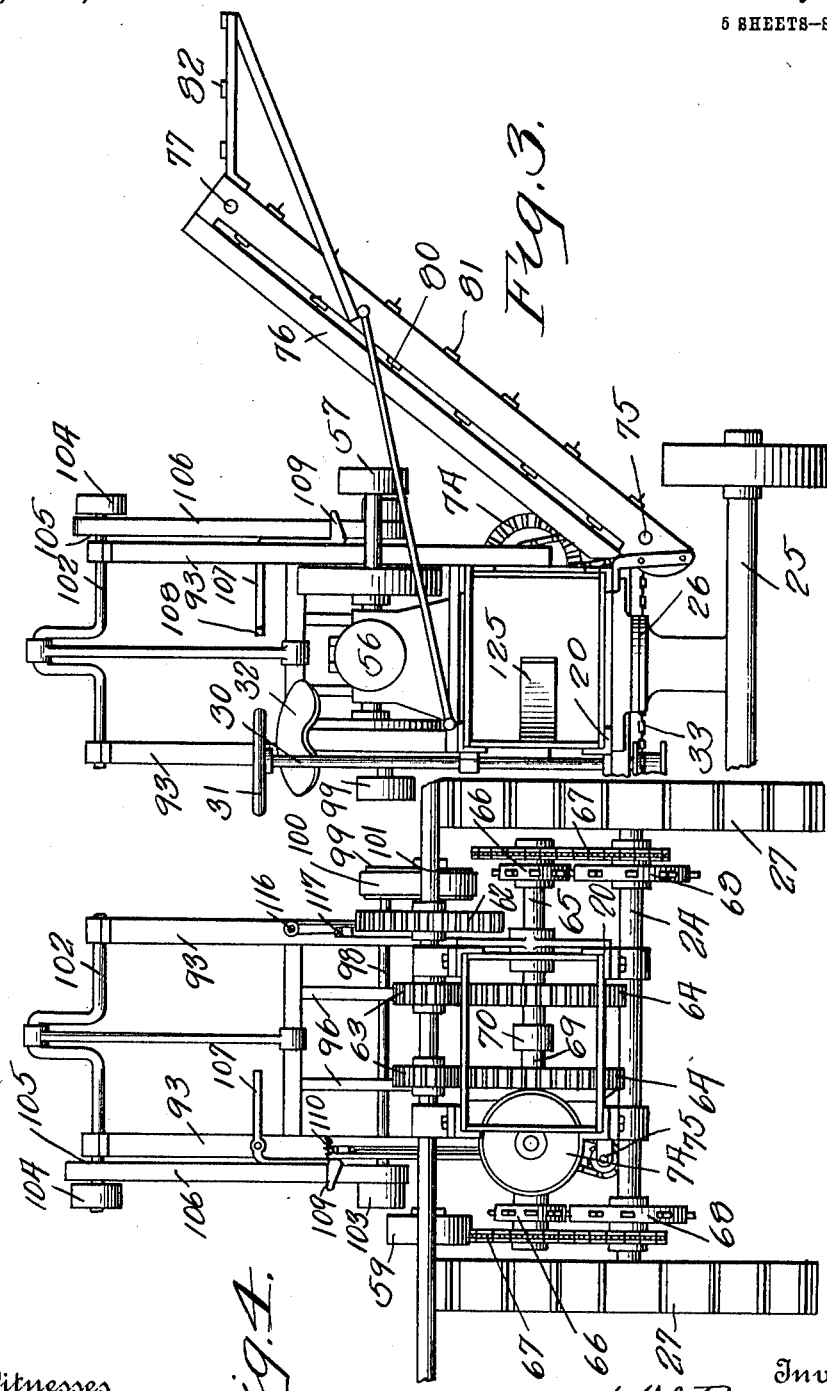

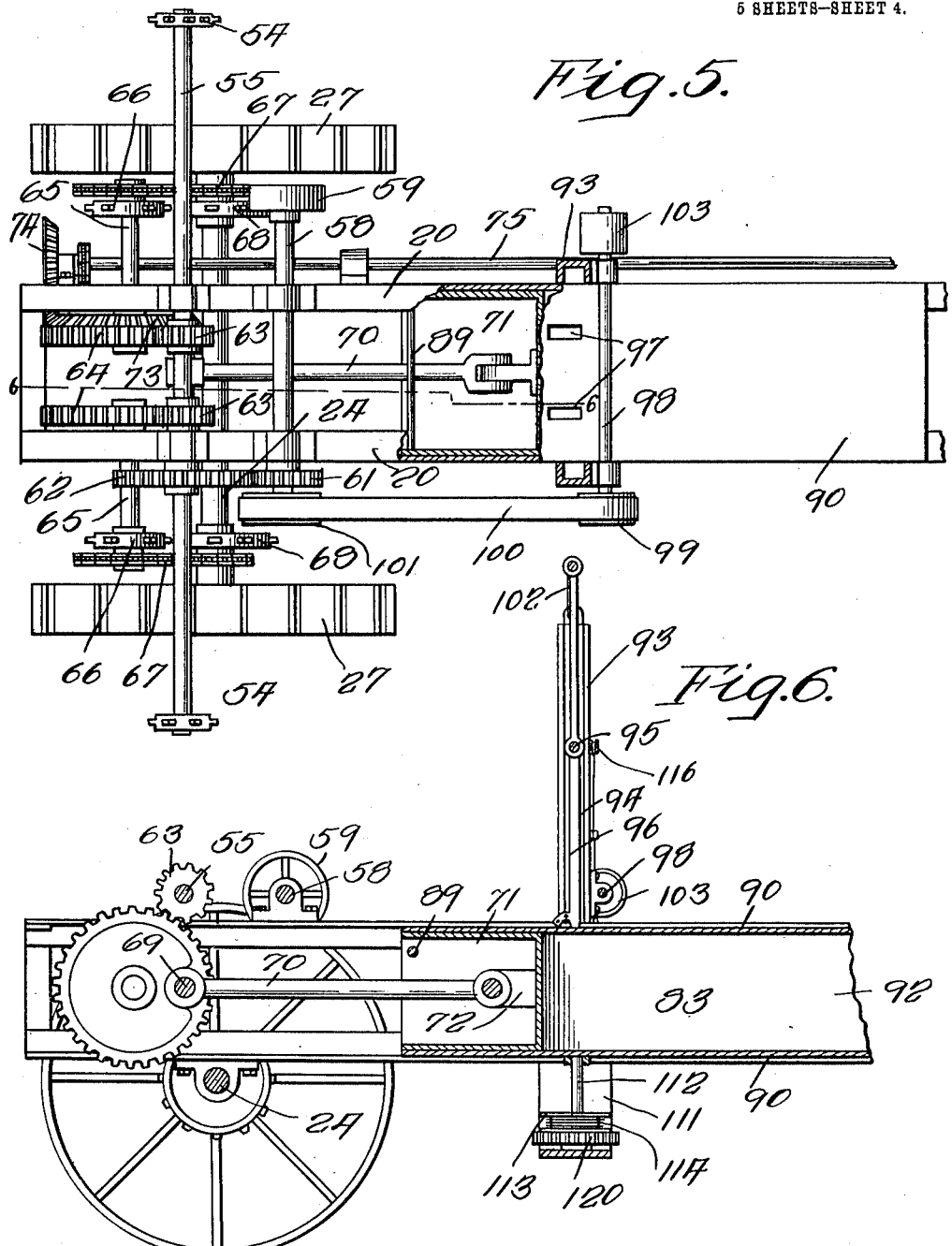

UNITED STATES PATENT OFFICE.

WILLIAM M. RANEY, OF DECATUR, ILLINOIS.

COMBINED HAY-BALER.

1,096,948.  Specification of Letters Patent.  Patented May 19, 1914.

Application filed April 12, 1913. Serial No. 760,662.

*To all whom it may concern:*

Be it known that I, WILLIAM M. RANEY, a citizen of the United States, residing at Decatur, in the county of Macon, State of Illinois, have invented certain new and useful Improvements in Combined Hay-Balers; and I do hereby declare the following to be a full, clear, and exact description of the invention, such as will enable others skilled in the art to which it appertains to make and use the same.

This invention relates to combined hay loaders and balers.

One object of the invention is to provide an improved form of hay loader and baler which will operate as the device is driven through the field.

A second object of the invention is to provide an improved form of gathering device for such a loader.

A third object of the invention is to provide an improved general construction of hay baler.

A fourth object of the invention is to provide improved means for wiring the bales.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and Figure 1 is a plan view of a machine constructed in accordance with this invention. Fig. 2 is a side elevation of such a loader and baler. Fig. 3 is a front elevation thereof. Fig. 4 is a rear elevation thereof. Fig. 5 is a partial plan view on the line 5—5 of Fig. 2. Fig. 6 is a section on the line 6—6 of Fig. 5. Fig. 7 is a section on the line 7—7 of Fig. 2. Fig. 8 is a detail section on the line 8—8 of Fig. 7. Fig. 9 is a detail front elevation showing the wire twisting and clipping mechanism. Fig. 10 is a side elevation thereof. Fig. 11 is a section on the line 11—11 of Fig. 10.

The body of this invention is formed by the hay baler and this baler is provided with a frame constructed of four longitudinal members 20 which are vertically spaced in pairs by struts 21 suitably spaced. The members of each pair are held in spaced relation by cross beams 22. This frame is suitably trussed by the truss rods 23 and the frame is provided with axles 24 and 25, the latter working on a fifth wheel 26. The rear axle 24 has fixed thereto ground wheels 27 while the front axle has similar ground wheels 28. Beneath the frame extends a cross beam 29 which supports a steering post 30 provided at its upper end with a hand wheel 31 and adjacent this hand wheel is a seat 32 for the operator. This steering post is connected by suitable chains 33 to points adjacent the ends of the axle 25, the chains being led over guide pulleys 34 supported on the cross beam 29. By this means the device may be guided in the desired direction.

It is to be understood that the wheels 27 are secured to the axle 24 by means of the usual pawl and ratchet device which is not deemed necessary here to be shown as the same is of the usual type used in devices of this description wherein provision has to be made for one of the driving wheels for the machinery turning faster than the other, as when going around a corner.

At the rear of the machine there is provided an elevator which consists of frame members 35 suitably spaced by means of cross members and at the top of this frame is a transverse shaft 36 while there is a similar shaft 37 at the bottom of said frame. These shafts carry sprocket wheels 38 over which run chains 39 which are connected by means of flights 40 which are provided with pin teeth 41. At the lower end of the frame are extension parts 42 whereon are mounted angle members 43 and swiveled in the horizontal part of each of the members 43 is a yoke 44 whereon is journaled a caster wheel 45. Projecting upward from each of the members 35 is a beam 46 which is braced to the respective member 35 by means of a brace 47. Extending across from one of the members 46 to the other is a rod 48 which carries a series of curved spring gathering teeth 49 and these teeth are so arranged that in the event of striking an unyielding obstruction they may move backward into contact with a stop bar 50 carried by arms 51 secured to the members 46.

On the ends of the shaft 36 are sprockets 52 which are connected by chains 53 with sprockets 54 keyed upon a shaft 55 mounted in suitable bearings on the upper frame members 20.

Mounted on the upper frame members 20 is an engine 56 which is provided with a belt wheel 57. Mounted in suitable bearings on the frame 20 is a shaft 58 which is provided with a belt wheel 59 connected to the belt wheel 57 by a belt 60. On the shaft 58 is a pinion 61 which meshes with a gear 62 on the shaft 55 so that as the engine operates the shaft 55 will be rotated and the elevator thereby actuated. On the shaft 55 there is also provided a pair of pinions 63 each of which meshes with a gear 64 fixed upon a respective shaft 65. On each shaft 65 is a pair of sprockets 66 either of which can be connected by means of a suitable chain 67 with one or the other of a pair of sprockets 68 fixed upon the axle 24. It is to be noted that the sprockets 66 on each shaft are of different sizes as are the corresponding sprockets 68 so that by this means the speed of the machine may be varied at will. Connecting the gears 64 is a wrist pin 69 whereto is connected one end of pitman 70, the other end being connected to a plunger 71 by means of a knuckle joint 72. It will now be seen that when the engine operates the machine will be driven forward and at the same time the plunger will be reciprocated.

On one of the shafts 65 is a bevel gear 73 which meshes with a bevel gear 74 mounted on a shaft 75 extending longitudinally of the machine. At the front end of the shaft 75 and extending laterally upward from the frame is a loader frame which includes parallel side members 76, the shaft 75 passing through the lower ends of these members. The shaft 77 passes through the upper ends of these members and on these shafts are spaced pairs of sprockets 78 which are connected by chains 79. The repective chains are connected by flights 80 which are provided with a series of pin teeth 81. At the top of this elevator is a platform 82 for the reception of the bale after it reaches the top of the elevator. It will now readily be understood that when the engine operates the bevel gear and other mechanism heretofore described will operate the elevator.

The plunger 71 reciprocates through a space in the baler which is called the feeding chamber and indicated at 83. Leading from the upper end of the loader is a hopper 84 and extending across the frame adjacent the bottom of this hopper is a shaft 85 whereon is fixed a series of feeder arms or levers 86 which form a portion of the floor in the hopper and which have their upper ends connected to a cut off curtain 87 wound around the spring roller 88 suitably supported below the hopper. The lower end of each arm 86 extends downward and bears against a cross bar 89 supported by the sides of the plunger 71 so that as the plunger moves backward the feeder operates to force the hay into the feeding chamber while at the same time the spring curtain prevents hay from falling behind the feeder arms and checking their backward movement. The spring curtain also has the further function of pulling the feeder arms backward as the plunger moves forward.

The baling chamber proper consists of top and bottom plates 90 each provided with wire receiving grooves 91. The chamber is also provided with side plates 92. At the rear of the baling chamber are mounted standards 93 wherein slides a needle frame consisting of vertical members 94 and a cross head 95 from which depend the needles 96. These needles pass through suitable openings 97 in the top plate 90. Supported adjacent the uprights 93 is a shaft 98 on which is a pulley 99 connected by a belt 100 with a pulley 101 on the shaft 58. At the upper ends of the uprights is a crank shaft 102 whereon are mounted the fast and loose pulleys 104 and 105. On the shaft 98 is a broad pulley 103, and either of the pulleys 104 and 105 may be connected to the pulley 103 by a belt 106, the same being shifted to either at will by the belt shifter connected to a lever 107 having a handle 108 adjacent the operator's seat. This lever carries at its other end a fork 109 which embraces the belt 106 so that when the lever is shoved up by the operator the belt is shifted onto tight pulley but when released it contacts with the needle frame and the belt is moved by the spring 110 onto the loose pulley. Mounted below the baling chamber is a frame 111 wherein is journaled a vertical shaft 112 carrying a drum 113 on which is wound a wire cable 114 having one end connected to one of the vertical members 94 directly while the other end extends upward over a pulley 116 and is brought down and connected to the other vertical member 94 as at 117. By this arrangement when the needle frame rises the shaft 112 will be rotated in one direction while, when the frame moves downward the shaft will be rotated in the opposite direction.

In alinement with each of the needles 96 and supported in the frame 111 is a shaft 118 on which is a gear 119 which meshes with a gear 120 on the shaft 112 so that as the latter rotates the shafts 118 also rotate. On each of these shafts 118 is carried a pair of pliers 121 which rotate with the shaft and thus twist the wire after it is passed around the bale and brought down by the needles. These pliers are normally held closed by means of suitable springs 122 but are opened as the needles come down by reason of the pliers being provided at their upper ends with beveled faces 123. Carried by each of the pliers is a pair of cutter jaws 124 which open with the respective pliers and close to cut off the wire as the pliers clamp on the same.

In the operation of the device the machine is driven through the field and the hay is gathered at the rear by the teeth 49 it is then carried up by the loader and passes down through the hopper 84 into the chamber 83 where it is packed by the arms 86. The plunger then moves forward and compresses it. At this time the wire is carried forward extending around the bale, but when the end of the bale is reached the operator moves the lever 108 and thereupon the needles carrying the upper part of the wire move downward. The closing of the pliers cuts off the wire and permits the bale to be shoved forward to the front of the machine where it is delivered to the elevator by the guide fingers 125. It is to be observed that these guide fingers 125 form means to direct completed bales laterally to the elevator.

There has thus been provided a simple and efficient device of the kind described and of the character specified.

It is obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

1. In a hay baler, a baling chamber having a feed opening, a plunger reciprocable in said chamber, packing levers pivoted at the rear of said feed opening and adapted to swing to and from said opening, downwardly projecting arms on said fingers and lying in the path of said plunger, and spring means to retract said fingers as the plunger moves forward.

2. In a hay baler, a baling chamber having a feed opening, a delivery chute leading to said feed opening and provided with a floor having the lower portion cut away, a plunger reciprocable in said chamber, levers pivoted at the rear of said opening and having lower ends engaging the rear of said plunger, the upper ends of said levers lying when idle in the cut away portion of the floor to form a continuance thereof, said upper ends constituting packing fingers when moved by said plunger, and spring means to retract said fingers as the plunger moves forward.

3. In a hay baler, a baling chamber having a feed opening, a plunger reciprocable in said chamber, packing levers pivoted at the rear of said feed opening and adapted to swing to and from said opening, downwardly projecting arms on said fingers and lying in the path of said plunger, and spring means to retract said fingers as the plunger moves forward, said spring means comprising a spring curtain roller, and a curtain wound on said roller and having its free edge attached to said fingers.

4. In a hay baler, a baling chamber having a feed opening, a delivery chute leading to said feed opening and provided with a floor having the lower portion cut away, a plunger reciprocable in said chamber, levers pivoted at the rear of said opening and having lower ends engaging the rear of said plunger, the upper ends of said levers lying when idle in the cut away portion of the floor to form a continuance thereof, said upper ends constituting packing fingers when moved by said plunger, and spring means to retract said fingers as the plunger moves forward, and a curtain wound on said roller and having its free edge attached to said fingers.

5. In a hay baler, a baling chamber having a feed opening, a plunger reciprocable in said chamber, packing levers pivoted at the rear of said feed opening and adapted to swing to and from said opening, downwardly projecting arms on said fingers and lying in the path of said plunger, means attached to said fingers to cover the feed opening and fingers when the plunger is retracted, and spring means to retract the fingers and draw the covering means away from the opening as the plunger moves forward.

6. In a hay baler, a baling chamber having a feed opening, a delivery chute leading to said feed opening and provided with a floor having the lower portion cut away, a plunger reciprocable in said chamber, levers pivoted at the rear of said opening and having lower ends engaging the rear of said plunger, the upper ends of said levers lying when idle in the cut away portion of the floor to form a continuance thereof, said upper ends constituting packing fingers when moved by said plunger, means attached to said fingers to cover the feed opening and fingers when the plunger is retracted, and spring means to retract the fingers and draw the covering means away from the opening as the plunger moves forward.

In testimony whereof, I affix my signature, in the presence of two witnesses.

WILLIAM M. RANEY.

Witnesses:
  IRA W. CLOKEY,
  JOSIAH M. CLOKEY.

Copies of this patent may be obtained for five cents each, by addressing the "Commissioner of Patents, Washington, D. C."